United States Patent [19]

Manning et al.

[11] 3,996,613
[45] Dec. 7, 1976

[54] DATA RECORDING AND TRANSMISSION APPARATUS UTILIZING NON-CONSECUTIVE ZERO CODING

[75] Inventors: Kenzel P. Manning, Phoenix, Ariz.; Martin Cohn, Arlington, Mass.; Abraham Lempel, Croton-on-Hudson, N.Y.

[73] Assignee: Sperry Rand Corporation, New York, N.Y.

[22] Filed: Oct. 21, 1975

[21] Appl. No.: 624,347

[52] U.S. Cl. .............................................. 360/40
[51] Int. Cl.² ........................................ G11B 5/09
[58] Field of Search ......... 360/39, 40; 340/347 DD

[56] References Cited
UNITED STATES PATENTS

| 3,226,685 | 12/1965 | Potter et al. | 360/40 |
| 3,713,123 | 1/1973 | Lipp | 360/40 |
| 3,750,121 | 7/1973 | Lee | 340/347 DD |

*Primary Examiner*—Vincent P. Canney
*Attorney, Agent, or Firm*—Howard P. Terry; Albert B. Cooper

[57] ABSTRACT

The invention is described in the environment of a binary data magnetic recording and reproducing system and comprises a binary to non-consecutive zero code converter for encoding the input binary data into a non-consecutive zero code which, in turn, is recorded on the magnetic medium. In recording, a flux transition occurs for each ONE of the non-consecutive zero code. A bipolar peak detector detects the flux transitions and thus detects the presence of the recorded ONEs. The peak detected signals are utilized to continuously trigger a mono-stable multivibrator having a period whereby the multivibrator relaxes to its stable state in the absence of a ONE which denotes the presence of a ZERO. The peak detected signal and the output of the mono-stable multivibrator are utilized to synthesize a clock signal from the recorded non-consecutive zero data. The recorded data is applied to a non-consecutive zero code to binary converter which is synchronized by the data derived clock to recover the originally recorded binary information.

11 Claims, 6 Drawing Figures

DATA RECORDING AND TRANSMISSION APPARATUS UTILIZING NON-CONSECUTIVE ZERO CODING

BACKGROUND OF THE INVENTION

1. Field of the Invention

The invention relates to binary recording and reproducing systems as well as to binary data transmission and receiving systems with particular reference to a system utilizing a non-consecutive zero code.

2. Description of the Prior Art

In prior art binary data recording and reproducing systems such as discs, drums and the like, binary input data is converted into a magnetic recording code which, in turn, is recorded on the magnetic medium. On readout the magnetic recording code is reconverted into the binary information for application to the utilization device. The reasons for the encoding and decoding as well as suitable magnetic recording codes are well known in the art. Conventionally, the magnetic recording code is written on the magnetic medium synchronously with regard to a clock pulse signal recorded on a clock track of the medium. For reasons well understood in the art, readout of the recorded code is synchronously effected usually with regard to a clock that is derived from the recorded code bits. The readout clock is conventionally derived from a phase locked oscillator loop that is continuously synchronized by the data. As is known, phase locked oscillators are complex, bulky, expensive and critical circuits having significant power requirements and not particularly well suited to environments where space, weight and cost are primary factors. Such an environment may, for example, be in airborne equipment such as that described in applicants' assignee's U.S. Pat. No. 3,864,784 entitled "Magnetic Disc Memory" and in copending patent applications Ser. No. 577,970, filed May 15, 1975 in the names of D. H. Duncan, C. T. Herdman and T. V. Littlejohn entitled "Magnetic Disk Memory"; Ser. No. 581,987, filed May 29, 1975 in the names of W. C. Post and E. E. Olive entitled "Steered Lateral Course Transition Control For Aircraft Area Navigation Systems"; Ser. No. 581,988, filed May 29, 1975 in the names of D. H. Baker, L. J. Bowe and W. C. Post entitled "Helical Vertical Path Control For Aircraft Area Navigation System"; and Ser. No. 598,904, filed July 24, 1975, in the names of D. H. Baker, L. J. Bowe, K. P. Manning and W. C. Post entitled "Vertical Path Control For Aircraft Area Navigation System."

Not only do phase locked oscillator loops suffer from the disadvantages discussed above but such devices are also subject to frequency drift and hence desynchronization when the spacings between the synchronizing bit transitions of the recording code are excessive.

An additional problem in the prior art is that known codes suitable for adequate clock generation utilizing phase locked oscillator loops are generally not adequately efficient, i.e., a maximum number of information bits mapped into a minimum number of recording code bits for the properties desired.

SUMMARY OF THE INVENTION

The above described disadvantages of the prior art are eliminated by the present invention by utilizing a novel and efficient magnetic recording code that has the property that runs a consecutive zeros in the code are limited to a maximum of one, i.e., the code has the property of non-consecutive zeros (NCZ). The phase locked oscillator loop of the prior art is replaced by a device to detect the recorded ONEs and a monostable device that is maintained in its astable state by the signals resulting from the detection of the recorded ONEs of the magnetic recording code and which relaxes to its stable state upon the absence of a ONE which signifies the presence of a ZERO. Thus the combination of the device to detect the ONEs and the monostable device to detect the ZEROs provide the required readout clock.

DESCRIPTION OF THE PREFERRED EMBODIMENT

The present invention utilizes an NCZ (non-consecutive zero) code for converting binary data into a suitable format for recording on a medium such as the magnetic-disk of the above noted patent and Duncan et al. application. On reproduction the recorded NCZ code is reconverted to recover the original binary data. Although the invention may be practiced with any NCZ code, an ideally suited code is utilized. The code is not only useful for recording and reproducing data with respect to a magnetic medium, but also for transmitting and receiving data through communication channels. The code results in achieving higher recording densities or higher transmission rates without necessitating an increase in the capacities of the storage or transmission media. The code is applicable to any sequential digital data storage or transmission device and is specifically applicable to magnetic recording (in both saturation and a.c.-bias modes) for disc, tape, drum, card, etc., as well as bubble memory and charge transfer storage devices and digital data transmission through communication channels. A combination of coding and modulation rules are utilized to uniquely separate the stream of binary data into blocks of lengths two or four, depending on the data. These data blocks are then encoded into NCZ code blocks of three or six binary digits respectively. The NCZ code blocks or code words define the modulation rule by which the information is impressed upon the storage or transmission medium. The recording code defines transitions of the medium from either of two states to the other. The recording or message so implemented is unambiguously recoverable and decodeable into the original information or data.

Utilizing the novel recording or data transmission code increases the density of recorded information or the rate of transmitted information beyond the capacities of currently used systems with comparably simple realizations, thus achieving excellent performance at low cost. This increase in density or rate is accomplished without sacrificing the feature of self-clocking or self-timing whereby the recorded or transmitted waveform synchronizes and stabilizes the recovery clock. The code provides a desirable decrease in maximum spacing between transitions thus alleviating synchronization. The code also provides an increase in the "detection window" or transition resolution required for accurate recovery. This results in either greater timing tolerance or the possibility of higher density or rate at a given tolerance. The code has identical performance to a theoretically optimum fixed-length (or block) code of word-length 18, but the encoding and decoding procedures or look-up table of the present code are far simpler.

Three basic steps are utilized in practicing the present invention, encoding, modulation and decoding. During encoding the original information stream is parsed or separated into groups of 2 or 4 data bits and encoded into groups of 3 or 6 code bits respectively in accordance with the following Table 1:

TABLE 1

| BINARY | NCZ |
|--------|-----|
| 0 0    | 1 1 1 |
| 0 1    | 0 1 1 |
| 1 0    | 1 0 1 |
| 1 1 0 0 | 0 1 0 1 0 1 |
| 1 1 0 1 | 0 1 0 1 1 1 |
| 1 1 1 0 | 1 1 0 1 0 1 |
| 1 1 1 1 | 1 1 0 1 1 1 |

The list of groups on the left hand side of Table 1 comprises a "complete prefix code" which has the property that any information stream can be unambiguously parsed into these groups. Each such group is then replaced by the corresponding code group on the right.

During modulation, the phase or position in time of the transitions between the two states of the recording or transmission medium represent the information, through the code, in the following fashion. The duration of every data bit is denoted by T. The duration of the information groups on the left hand side of the code Table 1 are thus 2T and 4T. A clock running at frequency 3/2T, marks the permissible data transition times. There are three and six transition times during information groups of two and four bits respectively. The code groups on the right hand side of Table 1 determine the modulation; a code "1" denotes the presence of a transition and a code "0" denotes the absence of a transition. A typical binary information stream, its encoding and its modulation pattern are illustrated in lines A through D of FIG. 2. Demodulation comprises merely detecting those potential transition times in which transitions actually take place. Decoding is performed by inverting the code Table 1. Decoding is unambiguous because the right hand side of the code Table has the "prefix property," i.e., no code word is the prefix or beginning of another code word.

It will be appreciated that the data bit stream is converted into a two-level recording waveform via the recording code of Table 1 where the information is conveyed by the location of the transitions in the waveform. These transitions are permitted only at regularly spaced intervals in time. Therefore, the waveform may be described by a binary sequence (code bits) in which 0 and 1 denote, respectively, the absence or presence of transitions at the time intervals as illustrated in lines (A) through (D) of FIG. 2.

The code of Table 1 may be viewed as a look-ahead block code, i.e., a code where $k$-bit data blocks are encoded into $n$-bit code blocks, and the encoding is contingent upon the next as well as the present data block. Design parameters for the code of Table 1 are as follows:

$k$ = data block length
$n$ = code block length
L = the minimum tolerable time between transitions. This parameter reflects the high frequency response of the system (e.g., sensitivity to pulse crowding) and should be made as large as possible.
U = The maximum tolerable time between transitions. This parameter imposes an upper bound on the time the recovery clock runs without synchronizing information and should be made as small as possible. This parameter also reflects the low frequency response of the system, e.g., "flats" in the read-back waveform.
W = Window or the minimum tolerable time interval for transition detection, i.e., the maximum tolerable distortion in a recoverable readback transition. This parameter should be made as large as possible.
$R_1$ = The mininum run of consecutive 0's.
$R_2$ = The maximum run of consecutive 0's.

Although many recording codes are fixed length codes, i.e., codes in which a block of $k$-data bits is always encoded into a block of $n$ code bits, the code of Table 1 may also be viewed as a variable length code where the ratio $k/n$ is fixed but the value of $k$ varies depending on the history of the data stream. In this code the encoding of a particular information word can depend on the next information word as well and, thus, can convey some of the forthcoming information. The recording code of Table 1 has the following desirable combination of code characteristics. $k = 2, 4$; $n = 3, 6$; $L = 0.67T$; $U = 1.33T$; $W = 0.67T$ with the timing tolerance being 0.33T; $R_1 = 0$ and $R_2 = 1$.

In the code of Table 1, 2-data bits are encoded via 3 code bits, or 4 data bits are encoded via 6 code bits. The encoding is relatively uncomplicated and unambiguous. Since the information words form a prefix tree, decoding merely utilizes the presence of a 1 in any multiple-of-three position to mark the end of a word and so is similarly unambiguous. As appreciated from Table 1, the data bits are encoded two at a time except for the 11 combination in which instance the encoder waits and encodes the 4-bit combinations illustrated in the Table. The decoding operation examines the code bits in groups of three, the coding operation beginning only if the last of the 3 code bits is a 1. In the present code there are only two valid transition spacings, namely 2T/3 and 4T/3. The code is a narrow band scheme, i.e., $U/L = 2$.

It is appreciated that code efficiency is a combination of code rate and implementation cost. The theoretical limit on code rate is 0.69 . . ., but is not attainable at finite cost. The rate of 0.67 achieved with the above described code is very close to the theoretical limit yet not costly. The cost's primary advantage is that conventional (block) codes of the same rate of 0.67 require storage of over 100,000 bits of dictionary, or comparably complicated logic. The avoidance of such is the present code's virtue.

Codes equivalent to that illustrated in Table 1 may be utilized. The essence of these codes is in the right hand side of the code book or dictionary as illustrated in Table 1. The codes are equivalent in an information theoretic and a coding theoretic sense. For example, the left hand side of the code book, that is, the input side, may be rearranged in order or 0's may be changed to 1's and 1's to 0's or any translation which doesn't affect the right hand side may be effected. For example, a code such as illustrated in the following Table 2 may be utilized.

TABLE 2

| BINARY | NCZ |
|--------|--------|
| 1 1    | 1 1 1  |
| 0 1    | 0 1 1  |
| 1 0    | 1 0 1  |
| 0 0 0 0 | 0 1 0 1 0 1 |
| 0 0 0 1 | 0 1 0 1 1 1 |
| 0 0 1 0 | 1 1 0 1 0 1 |
| 0 0 1 1 | 1 1 0 1 1 1 |

Figure 1:
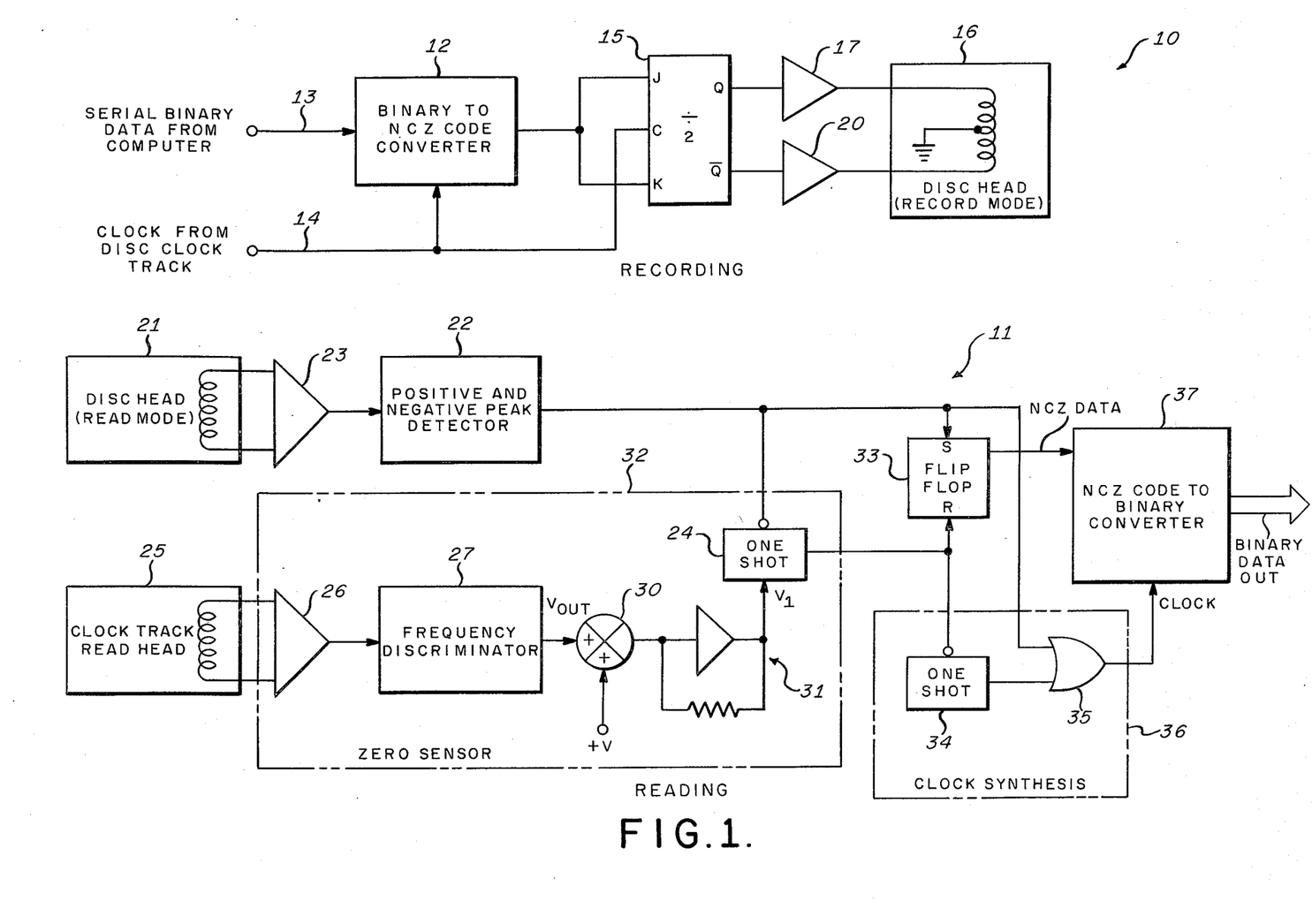
FIG. 1 is a schematic block diagram of a magnetic disc recording and reproducing system instrumented in accordance with the invention.
Figure 2:
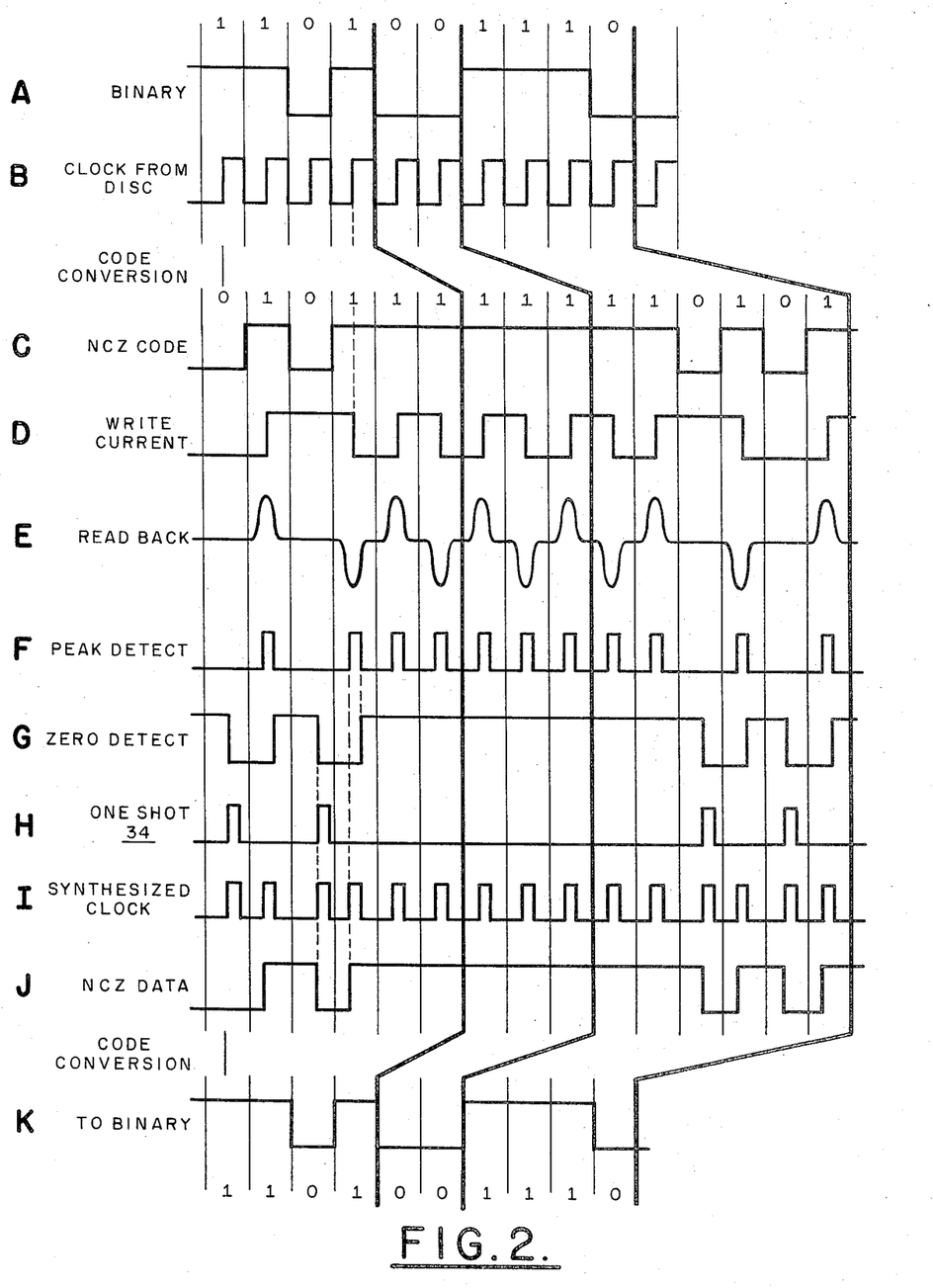
FIG. 2, consisting of 2A through 2K, is a waveform diagram of typical waveforms with regard to the apparatus of FIG. 1.

The present invention may be embodied utilizing an NCZ code but will be described in its preferred form utilizing the NCZ code of Table 1. Referring to FIG. 1, a magnetic disc recording and reproducing system instrumented in accordance with the invention is illustrated. The system includes a recording portion 10 and a reading or reproducing portion 11. Serial binary data from the computer of the system is applied to a binary to NCZ code converter 12 via a lead 13. A typical stream of binary data is illustrated in line A of FIG. 2. A clock signal from the disc clock track is applied to the converter 12 via a lead 14. The clock signal on the lead 14 is illustrated in line B of FIG. 2. As is well known, the clock pulse signal recorded on the disc clock track comprises a sequence of clock pulses, each pulse defining a recording bit interval on the disc. The converter 12 transforms the binary data on the lead 13 into NCZ code bits in synchronism with the clock signal on the lead 14 in a manner to be later described with respect to FIG. 3. The NCZ code signal corresponding to the binary input data on line A of FIG. 2 is illustrated on line C thereof. The parsing of the binary data in accordance with the recording code of Table 1 is denoted by the heavy vertical lines of FIG. 2.

The NCZ code output from the converter 12 is applied to the J and K inputs of a JK flip-flop 15, the clock input of which being connected to receive the clock pulse signal on the lead 14. The Q and the $\overline{Q}$ outputs of the flip-flop 15 are applied in push-pull fashion to record head 16 via amplifiers 17 and 20 respectively. The write current applied to the head 16 corresponding to the NCZ code sequence of line C of FIG. 2 is illustrated in line D thereof.

In the usual manner of a JK flip-flop, the flip-flop 15 toggles on the leading edges of the clock pulses when the inputs to J and K are both ONE and does not respond at the leading edges of the clock pulses when the inputs to J and K are ZERO. Thus it is appreciated that when the NCZ code bit is ONE, the current through the recording head 16 is reversed upon the receipt of the corresponding clock pulse thus recording a flux transition in the associated bit cell on the disc. When, however, the NCZ code bit is ZERO, no flux transition is recorded.

In the reading or reproducing portion 11 of the system a read head 21 provides a read back signal of the recorded flux transitions. Since an NCZ ONE code bit causes a flux transition either in one direction or the other, positive and negative pulses result in the presence of a recorded ONE. Since no flux transition occurs for a NCZ ZERO bit, no pulse results in the bit frame. The read back signal from the head 21 for the NCZ code sequence of line C of FIG. 2 is illustrated in line E thereof. The readback signal from the head 21 is applied to a positive and negative or bipolar peak detector 22 via an amplifier 23. The positive and negative peak detector 22 is a conventional circuit for providing a positive pulse in the presence of either a positive or a negative pulse at the input thereof. Thus the peak detector 22 provides a positive pulse in the presence of a recorded NCZ ONE bit and no pulse in the absence thereof. The output of the peak detector 22 corresponding to the recorded NCZ code sequence of line C of FIG. 2 is illustrated in line F thereof.

The output from the peak detector 22 is applied as an input to a retriggerable monostable multivibrator or one shot 24. The period of the one shot 24 is greater than the time from one data bit frame to the next but is less than the time to the second consecutive data bit frame. The pulse outputs from the peak detector 22 trigger the one shot 24 to its astable state and the one shot 24 relaxes to its stable state in the absence of a pulse from the peak detector 22 in a code bit frame. Thus for consecutively recorded NCZ ONEs, the one shot 24 is maintained in its astable state by the pulses from the peak detector 22. When, however, there is an intervening NCZ ZERO bit, the one shot 24 relaxes to its stable state in the bit frame containing the ZERO. The output of the one shot 24 corresponding to the NCZ recorded code sequence of line C of FIG. 2 is illustrated in line G thereof.

Since magnetic discs often exhibit a variation in the angular velocity of the disc, it is desirable to regulate or servo the period of the one shot 24 to the disc velocity to achieve jitter tolerance. To this effect, the clock track read head 25 provides a clock pulse train with pulse repetition frequency related to the disc angular velocity. This clock pulse signal is applied via an amplifier 26 to a frequency discriminator 27. The frequency discriminator 27 is a conventional device that converts the clock pulse output from the amplifier 26 to a voltage $V_{OUT}$ directly proportional to frequency variations from the nominal angular velocity of the disc. Thus the voltage $V_{OUT}$ is proportional to $(f-f_0)$ where $f$ is the instantaneous frequency of the disc rotation and $f_0$ is the nominal frequency thereof. It will be appreciated that when the disc is rotating at its nominal frequency $f_0$, $V_{OUT}$ is equal to zero volts. The $V_{OUT}$ signal from the frequency discriminator 27 is applied as an input to a summing junction 30, the other input thereof receiving a reference voltage V. The output of the summing junction 30 is applied as a voltage $V_1$ to the one-shot 24 via an operational amplifier 31. The one shot 24 is a commercially procurable device which provides a period inversely proportional to the voltage $V_1$. It is thus appreciated that the components 24, 26, 27, 30 and 31 form a ZERO sensor 32 for detecting the 0's in the recorded NCZ code, achieving jitter tolerance with respect to variations in the dic angular velocity. Thus it is appreciated that the peak detected signals from the peak detector 22 indicate NCZ 1's and relaxation of the retriggerable one shot 24 indicates NCZ 0's. It will furthermore be appreciated that the period of the one shot 24 may be servoed to the disc angular velocity by means of any tachometer device that provides an output in accordance with the angular velocity.

The output of the peak detector 22 is applied to the set input of a flip-flop 33 while the output of the one shot 24 is applied to the reset input thereof. Since the pulse outputs from the peak detector 22 are representative of the recorded NCZ 1's and the output of the one shot 24 is representative of recorded NCZ 0's, the NCZ data is provided on the output of the flip-flop 33, a high on the output designating an NCZ recorded ONE and a low designating a ZERO. The output of the flip-flop 33 corresponding to the NCZ code sequence of line C of FIG. 2 is illustrated in line J thereof.

The output of the one shot 24 is applied to a retrigerable monostable multivibrator or one shot 34 for shaping the clock pulses corresponding to the NCZ 0's. When the one shot 24 relaxes to its stable state indicating the presence of a NCZ ZERO, the one shot 34 is triggered to produce a clock pulse. The output of the one shot 34 is illustrated in line H of FIG. 2. The output of the one shot 34 and the output of the peak detector 22 are applied to an OR gate 35 to combine the pulses from the peak detector 22 representative of the presence of NCZ 1's and the pulses from the one shot 34 representative of the presence of NCZ 0's to provide a synthesized data derived clock. The components 34 and 35 comprise a clock synthesis block 36. The output of the clock synthesis block 36 is illustrated in line I of FIG. 2.

The NCZ recorded data from the flip-flop 33 as well as the data derived synthesized clock from the block 36 are applied to an NCZ code to binary converter 37. The converter 37 transforms the NCZ data to binary data in synchronize with the clock from the clock synthesis block 36 in a manner to be described hereinafter. The converter 37 recovers the originally recorded data applied at the line 13. The binary output of the converter 37 corresponding to the recorded NCZ code sequence of line C of FIG. 2 is illustrated in line K thereof.

Figure 3:
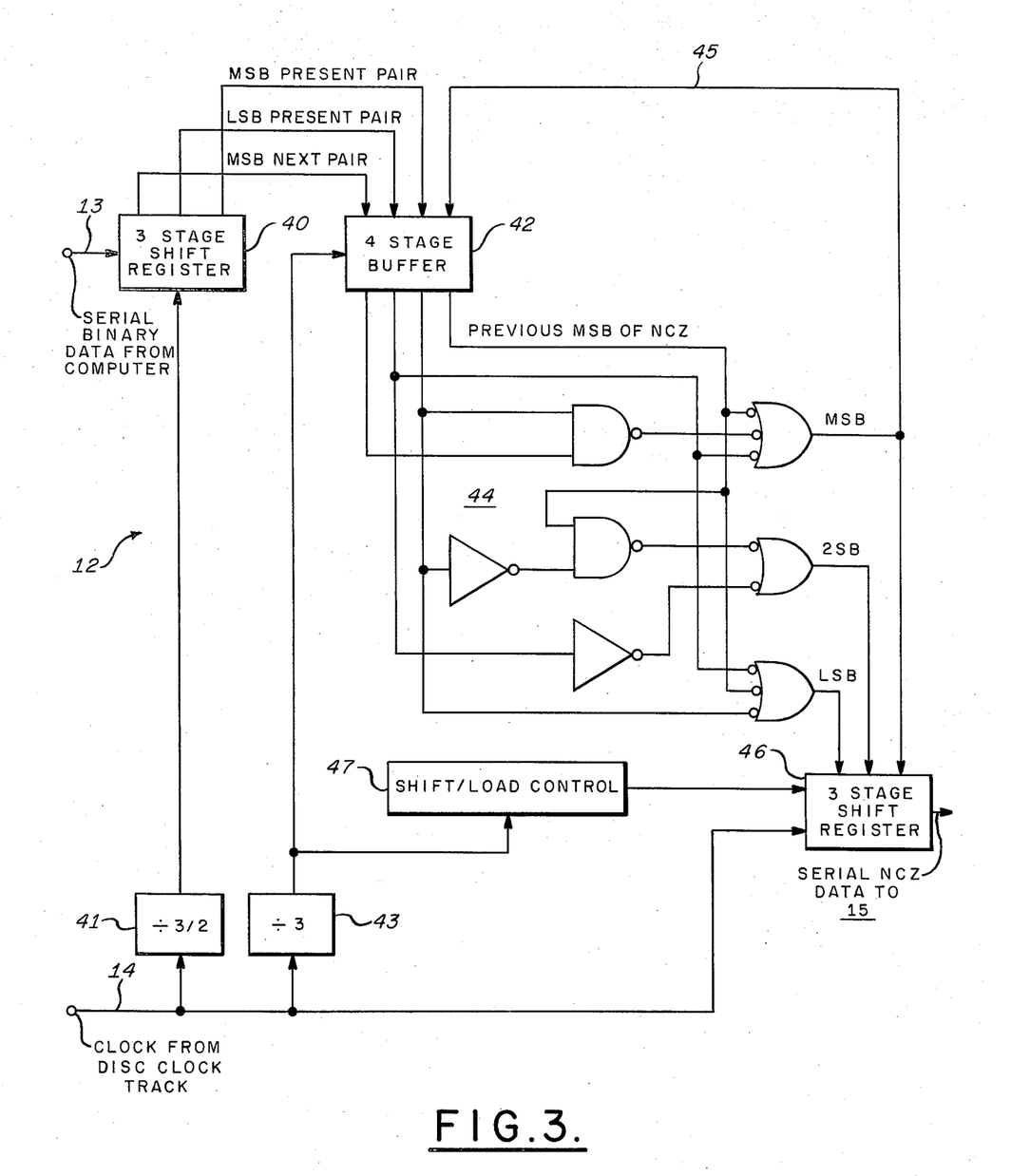
FIG. 3 is a schematic block and logic diagram of the binary to NCZ code converter suitable for use in the apparatus of FIG. 1.

Referring now to FIG. 3, a binary to NCZ code converter suitable for implementing the block 12 of FIG. 1 is illustrated. The serial binary data from the computer applied on the line 13 is processed in bit pairs to provide three bits of NCZ coding in synchronism with the clock from the disc clock track applied on the lead 14. The binary data is continuously shifted through a three stage shift register 40 under control of a shifting clock from a block 41 responsive to the disc clock track on the lead 14. As indicated by the legend, the block 41 divides the disc clock by 3/2. Since the disc clock is synchronous with the NCZ data and there are two binary bits for each three NCZ bits, the shifting clock applied to the shift register 40 is synchronous with the binary data. As indicated by the legends associated with the output leads of the shift register 40, a conversion from two binary bits to three NCZ bits requires the most significant bit (MSB) of the present binary bit pair, the least significant bit (LSB) of the present binary bit pair, and the MSB of the next binary bit pair. These binary bits are loaded into a four stage buffer register 42 under control of a shifting clock from a block 43 responsive to the clock from the disc clock track on the lead 14. The block 43 divides the pulse repetition frequency of the disc clock by three to provide the loading signals for the buffer register 42. Since the serial binary data on the lead 13 is applied MSB first, it is appreciated from the relative timing with respect to the blocks 41 and 43 that the binary bit pairs as well as the MSB of the next pair are parallel loaded into the buffer register 42 prior to the shifting of the next binary pair into the register 40 preparatory to conversion to NCZ code.

The four outputs of the buffer register 42 are applied to combinational NAND logic 44 as illustrated to provide the most significant bit, the second significant bit and the least significant bit as indicated by the legend of the 3 bit group of NCZ coding corresponding to the binary pair stored in the register 42. In order to provide the conversion, the combinational logic 44 requires the MSB of the previous NCZ group of 3 bits. This is provided by the lead 45 as indicated by the legends in the drawing.

The MSB, 2SB and LSB of the present NCZ group of 3 bits is parallel loaded into a three stage parallel access shift register 46. The register 46 is of conventional design and is responsive to the clock signal on the lead 14 for shifting the NCZ data in serial fashion out of the register and is also responsive to a conventional shift/load control 47 for controlling the parallel loading of the 3 NCZ bits from the combinational logic 44 and thereafter shifting the 3 bits out of the register in serial fashion. The shift/load control 47 is responsive to the divided by three clock from the block 43 to provide this function with appropriate delays such that the interleaved functions of shifting and loading do not interfer with one another. Thus it is appreciated that a steady stream of NCZ data is provided from the shift register 46 to the flip-flop 15 of FIG. 1.

Figure 4:
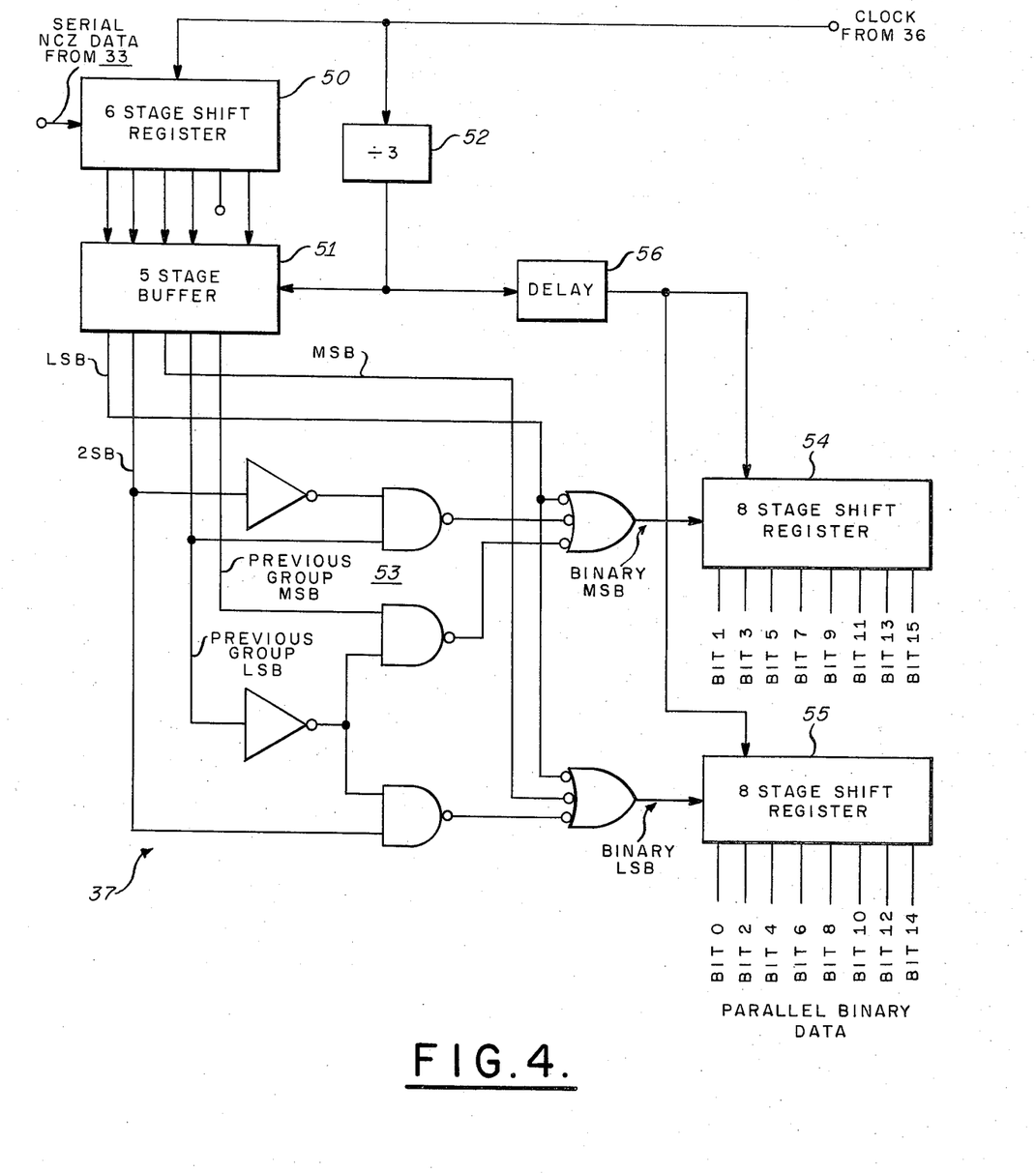
FIG. 4 is a schematic block and logic diagram of a NCZ code to binary converter suitable for use in the apparatus of FIG. 1.

Referring now to FIG. 4, an NCZ code to binary converter suitable for implementing the block 37 of FIG. 1 is illustrated. The serial NCZ data from the flip-flop 33 of FIG. 1 is shifted through a six stage shift register 50 under control of the data derived clock from the clock synthesis block 36 of FIG. 1. The parallel output of the register 50 is applied to a five stage buffer register 51 which is controlled in response to a loading signal from a block 52. The loading signal is derived by dividing the pulse repetition frequency of the clock synthesis signal from the block 36 by three. Thus it is appreciated that for every 3 input bits shifted into the register 50, the contents of the register 50 are parallel loaded into the buffer register 51. As illustrated in FIG. 4, only the four left most outputs and the right most output of the register 50 are connected to the five stages of the buffer 51, the fifth stage of the register 50 not being connected thereto. The connections shown are utilized since the NCZ data is shifted into the register 50 MSB first and is processed in 3 bit groups, the LSB and MSB of the previous 3 bit NCZ bit group being required for the conversion. Thus it is appreciated that the MSB, 2SB and LSB of the present NCZ bit group are converted from the three left most stages of the buffer register 51 as indicated by the legends with the previous group MSB and LSB being provided by the two right most stages of the register 51.

The outputs of the buffer register 51 are applied to combinational NAND logic 53 to provide the binary MSB and LSB in parallel corresponding to the 3 NCZ bits from the three left most outputs of the buffer register 51. The binary MSB and LSB from the combinational logic 53 are applied to eight stage shift registers 54 and 55 respectively. The shift registers 54 and 55 are controlled by a shifting clock derived from the block 52 through a suitable delay 56. Thus the binary MSB's and LSB's are shifted into the registers 54 and 55 in parallel, the output bit positions of the binary output word as indicated by the legends when the registers 54 and 55 are full. Conventional means (not shown) are utilized for extracting the sixteen bit binary word from the registers 54 and 55.

It will be appreciated from the foregoing that because of the use of an NCZ code, the requirement for a critical phase locked oscillator loop to generate the data derived clock has been eliminated. Instead the present invention utilizes the relatively simple and hence inexpensive peak detector and monostable multivibrator arrangement to generate the accurately synchronous data derived clock signal as illustrated in FIG. 1.

Figure 5:
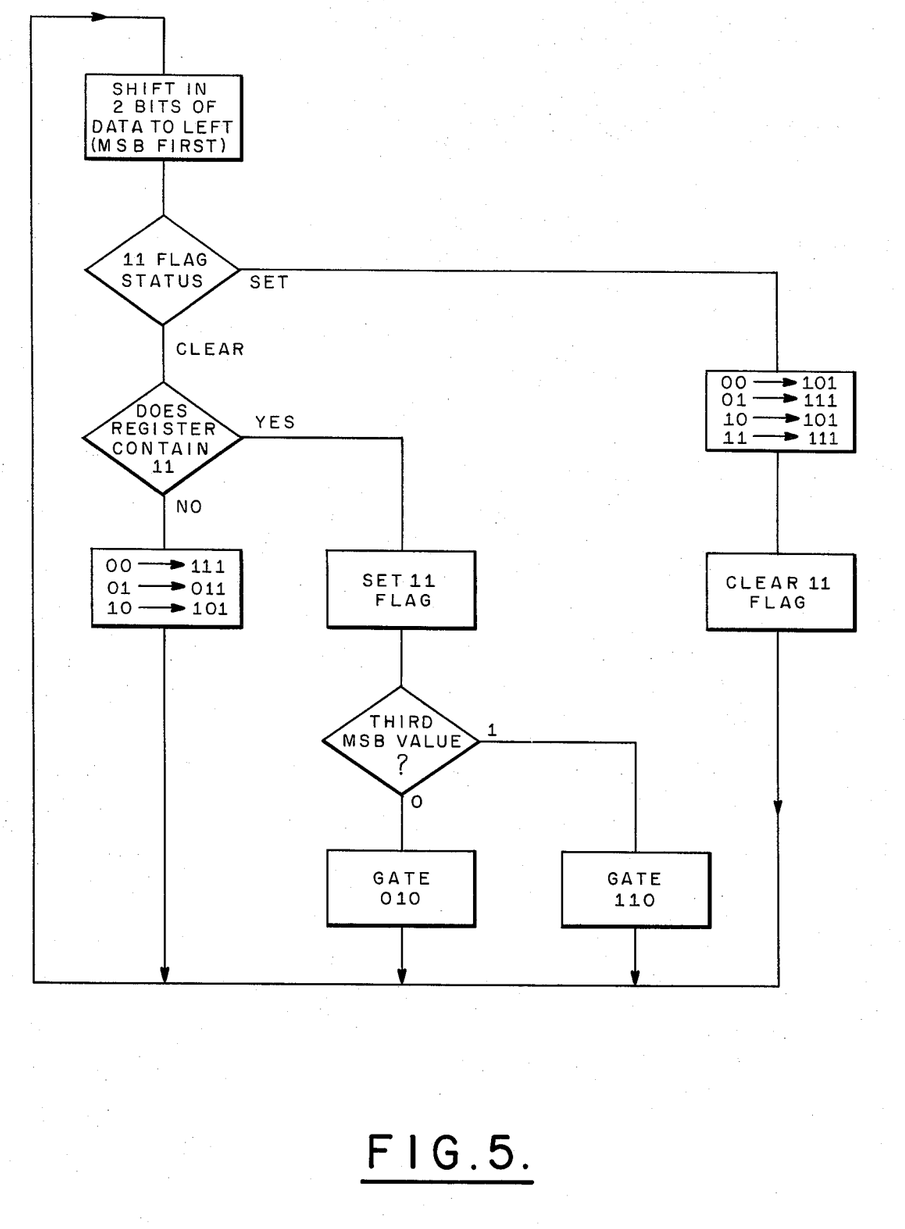
FIG. 5 is a flow diagram of a conversion procedure from binary to NCZ code.
Figure 6:
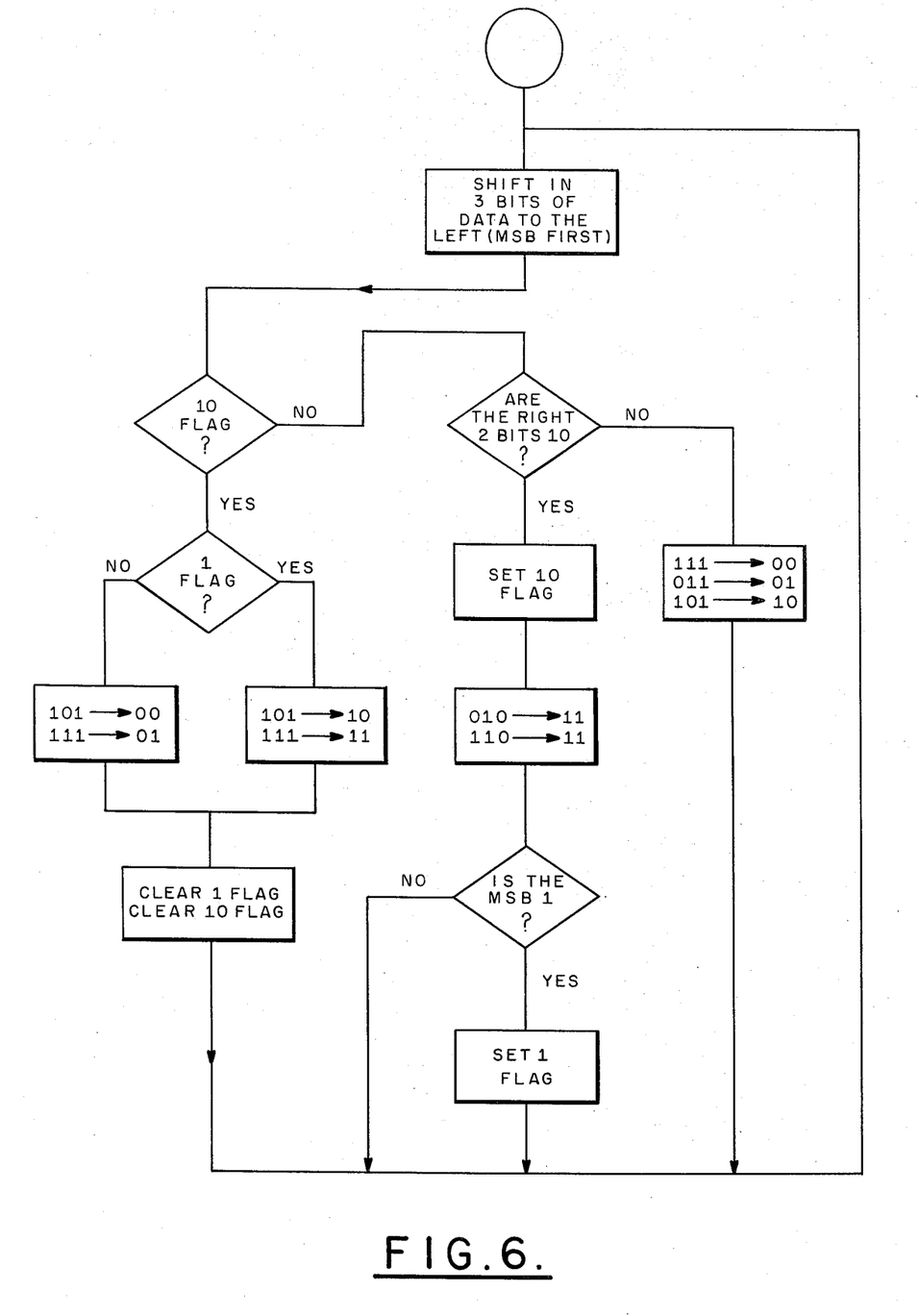
FIG. 6 is a flow diagram of a conversion procedure from NCZ code to binary.

Referring now to FIG. 5, a flow chart which may be utilized to practice the binary to NCZ conversion of block 12 of FIG. 1 with hard wired logic or on a general purpose digital computer is illustrated. The coding required to implement the flow chart is straight forward and will not be discussed for brevity. FIG. 6 similarly illustrates a flow chart for practicing the NCZ to binary conversion of block 37 of FIG. 1 with hard wired logic or on a general purpose digital computer.

The preferred embodiment of the invention was described in terms of a magnetic disc recording and reproducing system. It will be appreciated that the concepts of the present invention may be utilized for any binary recording and reproducing system as well as binary communication systems utilizing transmission such as fsk and the like. The preferred embodiment of the invention was described in terms of non-consecutive 0's and flux transitions at the NCZ 1's. It will be appreciated that the designations of ONE and ZERO are arbitrary and may be interchanged in practicing the invention.

The preferred embodiment of the invention was described in terms of a non-consecutive zero recording code and the monostable multivibrator 24 of FIG. 1 for detecting the 0's. It will be appreciated that the invention may be practiced utilizing run bounded recording codes in general where the run of consecutive 0's if bounded by a maximum value. In this instance a separate monostable multivibrator would be required for each of the permissible 0's, the periods of the multivibrators being chosen consecutively longer to correspond to the number of consecutive bit frames that the consecutive 0's would occupy. Each of these multivibrators would be reset in a manner similar to the multivibrator 24 of FIG. 1 by the detected 1's. For example, if $R_2 = 2$, two multivibrators would be required, the first having a period equal to that of the multivibrators 24 of FIG. 1, the second having a period of one data frame longer than the first.

While the invention has been described in its preferred embodiments, it is to be understood that the words which have been used are words of description rather than limitation and that changes may be made within the purview of the appended claims without departing from the true scope and spirit of the invention in its broader aspects.

We claim:
1. Magnetic medium recording and reproducing apparatus for binary data signals comprising
    first converter means for converting said binary data signals to non-consecutive zero recording code signals,
    means for recording said non-consecutive zero code signals on said medium by generating a flux transition for each ONE of said non-consecutive zero signals and by not generating a flux transition for each ZERO thereof,
    detecting means for detecting said flux transitions and providing first pulses in accordance therewith, respectively, thereby detecting the presence of said ONE's,
    monostable means having a stable state and an astable state and responsive to said first pulses for being maintained in said astable state thereby and for relaxing to said stable state upon the absence of a first pulse, thereby detecting the presence of said ZERO's,
    pulse generating means coupled to said monostable means for providing second pulses in response to said relaxing of said monostable means,
    combining means responsive to said first and second pulses for providing a clock pulse train in accordance therewith,
    data generating means responsive to said first pulses and coupled to said monostable means for providing non-consecutive zero recorded data signals, and
    second converter means responsive to said non-consecutive zero recorded data signals and said clock pulse train for converting said non-consecutive zero recorded data signals to binary data signals in synchronism with said clock pulse train.

2. The apparatus of claim 1 in which said detecting means comprises a bipolar peak detector.

3. The apparatus of claim 1 in which said monostable means comprises a monostable multivibrator with period greater than one non-consecutive zero data bit interval and less than two said intervals.

4. The apparatus of claim 3 in which said monostable multivibrator comprises a monostable multivibrator with a voltage adjustable period.

5. The apparatus of claim 4 in which said magnetic medium comprises a magnetic disc and further including angular velocity responsive means for providing an angular velocity signal representative of angular velocity variations with respect to the nominal angular velocity of said disc,
    said monostable multivibrator being responsive to said angular velocity signal for adjusting said period, thereby compensating for said angular velocity variations.

6. The apparatus of claim 5 in which said angular velocity responsive means comprises
    magnetic head means for reading a clock track of said disc, and
    frequency discriminator means coupled to said magnetic head means for providing said angular velocity signal.

7. The apparatus of claim 1 in which said pulse generating means comprises a further monostable multivibrator.

8. The apparatus of claim 1 in which said data generating means comprises a flip-flop having the set input thereof responsive to said first pulses and the reset input thereof coupled to said monostable means.

9. The apparatus of claim 1 in which said first and second converter means comprise means for performing said binary to non-consecutive zero and said non-consecutive zero to binary conversions respectively in accordance with the following Table:

| BINARY | NCZ |
|--------|--------|
| 0 0 | 1 1 1 |
| 0 1 | 0 1 1 |
| 1 0 | 1 0 1 |
| 1 1 0 0 | 0 1 0 1 0 1 |
| 1 1 0 1 | 0 1 0 1 1 1 |
| 1 1 1 0 | 1 1 0 1 0 1 |
| 1 1 1 1 | 1 1 0 1 1 1 |

10. Apparatus for conveying binary coded data signals on a medium comprising first converter means for converting said binary coded data signals to zero run bounded code signals, means for conveying said run bounded code signals on said medium by transitioning said medium from one state to another for each ONE of said run bounded code signals and by not transitioning the state of said medium for each ZERO of each run bounded code signals, detecting means for detecting the transitions of said medium and providing first pulses in accordance therewith, respectively, thereby detecting the present of said ONE's, monostable means having a stable state and an astable state and responsive to said first pulses for being maintained in said astable state thereby and for relaxing to said stable state upon the absence of a first pulse, thereby detecting the presence of said ZERO's, pulse generating means coupled to said monostable means for providing second pulses in response to said relaxing of said monostable means, combining means responsive to said first and second pulses for providing a clock pulse train in accordance therewith, data generating means rsponsive to said first pulses and coupled to said monostable means for providing said run bounded code signals conveyed on said medium, and second converter means coupled to said data generating means and responsive to said clock pulse train for converting said run bounded code signals to binary data signals in synchronism with said clock pulse train.

11. The apparatus of claim 10 in which said first and second converting means comprise means in which said run bounded code signals comprise non-consecutive zero code signals.

* * * * *